Patented Oct. 30, 1934

1,978,431

UNITED STATES PATENT OFFICE 1,978,431

PROCESS OF PRODUCING NITRITES

William E. Kirst, Woodbury, N. J., and Fred J. G. Thedieck, Richmond, Va., assignors to E. I. du Pont de Nemours & Company, Wilmington, Del., a corporation of Delaware No Drawing. Application June 13, 1929, Serial No. 370,744

17 Claims. (Cl. 23—104)

This invention relates to an improved process of producing various nitrites of the alkaline and alkaline earth metals, and more particularly to the production of sodium nitrite.

It was formerly the practice to prepare sodium nitrite by the reduction of sodium nitrate by means of various reducing agents. Such processes are, however, no longer commercially practicable. Acording to present practice, the process of producing sodium nitrite consists in general in the absorption of oxides of nitrogen in an alkaline solution or suspension. There are three principal sources for these oxides. They may be produced by (1) the oxidation of air in the well known arc process, (2) the catalytic oxidation of ammonia on various catalysts, or (3) from the waste gases from an ammonia oxidation plant which is run primarily for the production of nitric acid. In the latter case they constitute the unabsorbed oxides leaving the acid system.

While our invention will be illustrated as applied specifically to the production of sodium nitrite, it is to be understood that we do not intend to limit ourselves thereto, as our new process is appliable to the production of nitrites generally.

In the production of sodium nitrite, the following chemical reactions are generally accepted as being involved:

(1) $NO + NO_2 + 2NaOH = 2NaNO_2 + H_2O$
(2) $H_2O + 3NO_2 + 2NaOH = 2NaNO_3 + NO + 2H_2O$
(3) $2NO + O_2 = 2NO_2$

The ratio of NO to $NO_2$ as used herein is referred to as the state of oxidation. By this is meant the percentage of the total oxides present as $NO_2$. That is, if the gases contain no $NO_2$, the state of oxidation is considered to be 0%; if the gases contain equal molecular amounts, the state of oxidation is 50%; while if all the oxides present are in the form of $NO_2$ the state of oxidation is 100%.

Considerable discussion has taken place in the literature as to the existence of the hypothetical nitrogen trioxide, $N_2O_3$, which is commonly known as nitrous anhydride. It has now been satisfactorily proven that this compound does not exist as $N_2O_3$ in the presence of water and that reaction (1) above occurs as written, and that NO does not first react with $NO_2$ to form $N_2O_3$. A discussion of this point may be found in the following literature references: Lunge—Angewandte Chemie, vol. 19, p. 807, Klinger—Zeitschrift fur Angewandte Chemie, vol. 27, p. 7, Burdick & Freed—Journal Am. Chem. Soc. vol. 43, p. 518, especially p. 523, and Raschig Prahl.—Zeit. fur Angewandte Chemie, March 9, 1929, p. 55–57.

From the foregoing it can be seen that so long as $NO_2$ is present there is a possibility of reaction (2) occurring. This may be otherwise stated as meaning that the NO and the water present compete for the $NO_2$ so that there is always the possibility of forming some nitrate.

Processes for nitrite production have heretofore been patented based on the belief that the oxides must be present in such ratios that there is slightly more than the theoretical amount of NO according to the foregoing reaction (1). In this connection, reference is made to United States patent to Fritz Rothe, #1,070,070.

We have found, however, that when operating in this manner, with a state of oxidation approximately 50%, considerable nitrate is still formed. Furthermore, we have found that nitrite solutions can be produced containing a very much smaller amount of nitrate if the ratio of NO to $NO_2$ is much greater than the theoretical. In other words, we have discovered that it is much more desirable to maintain the state of oxidation under 40% and preferably under 25%. In most instances we have found it necessary to control the absorption reaction in a particular manner when operating at such a state of oxidation in order to realize a sufficiently high recovery of the oxides present.

Explanation is here given briefly of the desirability of reducing nitrate formation to a minimum. The purity necessary in order to produce a commercial product requires that a fractional crystallization of sodium nitrite solutions so produced be carried out. In performing this operation, certain equilibria are obtained beyond which it is not possible to separate a usable nitrite from the mother liquors. Conditions are such that with normal operation every pound of nitrate formed carries with it nearly two pounds of nitrite in the discard salts. Since sodium nitrite is much more valuable than the nitrate, it will be found highly desirable to carry out the neutralization in such a manner as to reduce the amount of discard salts to a minimum.

We have found that when working with gases containing oxides of nitrogen of a low state of oxidation that two methods are available for controlling the state of oxidation and the overall absorption efficiency. The first of these is particularly applicable to ammonia oxidation processes and consists in so adjusting the percentage of ammonia burned as to result in a deficiency of oxygen for complete oxidation to nitric acid. Since the primary material formed by such a process is NO, a shortage of oxygen results in a slowing down of the reaction to form $NO_2$ from NO.

The second method of control applies generally to all three sources for oxides. It consists in absorbing them at a low state of oxidation and adding in a graduated and controlled manner the amount of air or oxygen necessary at successive points in the absorption system. When this is done, a low state of oxidation is maintained throughout the system and at the same time complete absorption is obtained. By operating in this manner the relative number of molecules of $NO_2$ is kept at a minimum and since reaction (1) is more rapid than reaction (2) and since there are a relatively large number of molecules of NO present, the possibility of reaction (1) occurring more completely is greatly increased.

Where it is desired to produce nitrite exclusively by the oxidation of ammonia, it is essential that the products from the converter be handled in a somewhat different manner than is otherwise necessary. It is a generally known fact that the extent of conversion of NO to $NO_2$ by oxygen is dependent upon the temperature, and the claims of our present invention are not based on this step in the process. We have, however, found that advantages may be realized in operating the converter producing the oxides of nitrogen on such a mixture of gases that will yield a gas containing oxides of nitrogen with less than sufficient residual oxygen to convert all of the NO to $NO_2$. We have also found it desirable while maintaining the gases at a suitable temperature before absorption and with a low percentage of unreacted oxygen to add the necessary extra oxygen in graduated steps during absorption.

A modified form of the foregoing process comprises producing a certain amount of weak nitric acid before absorption. In the ammonia oxidation reaction a considerable amount of water is formed, and it is the practice in some cases to pass the products from the converter through a suitable condensing apparatus and remove a portion of the oxides of nitrogen as weak nitric acid. We have found that the uncondensed gas leaving such a cooler offers a very satisfactory source for nitrite production. When operating the process according to this modification it will be found very advantageous to control the mixture fed to the converter in the manner described in the foregoing, and to also control the addition of oxygen during absorption.

A still further modification of our process comprises first passing the products of conversion through an absorption system to produce nitric acid and then converting the unabsorbed oxides to nitrite in a second absorption system. When operating in this manner, an ammonia oxidation plant has a considerably greater flexibility than would be the case under the usual operating conditions. This method has the added desirable advantage of increasing the overall absorption efficiency and at the same time yielding a valuable by-product. There is the still further advantage that the ratio of ammonia burned to nitrite and nitric acid respectively may be varied within rather wide limits. As a result of this, such a plant can be operated to a considerably greater economic advantage than when producing nitric acid alone.

As a specific illustration of the results obtained when operating by our new process, we have found that solutions of sodium nitrite can be produced containing 98% sodium nitrite and 2% sodium nitrate on a nitrite-nitrate basis. When operating to produce such a solution it has been found that over 95% of the oxides of nitrogen entering the alkaline absorption system can be recovered.

It will, of course, be understood that in operating our process the solutions will be kept sufficiently alkaline at all times. It will be apparent that if this is not done no nitrite will be formed and the $NO_2$ present will react with water to form nitric acid. When the solution is again made alkaline, this nitric acid will react to form nitrate as will be obvious. This is due to the fact that nitrous acid, although formed temporarily, is not stable and immediately breaks down to form nitric acid and further NO.

As many apparent and widely different embodiments of this invention may be made without departing from the spirit thereof, it is to be understood that we do not limit ourselves to the foregoing examples or description except as indicated in the following claims.

We claim:

1. In a process of producing nitrites in which gases containing oxides of nitrogen are absorbed in a suitable solution or suspension of the desired alkali base, the step which comprises maintaining the state of oxidation prior to and during absorption at not over 40%.

2. In a process of producing nitrites in which gases containing oxides of nitrogen are absorbed in a suitable solution or suspension of the desired alkali, the steps which comprise controlling the amount of free oxygen in the gas and maintaining a state of oxidation prior to and during absorption of not over 40%.

3. In a process of producing nitrites in which gases containing oxides of nitrogen are absorbed in a suitable solution or suspension of the desired alkali, the step which comprises controlling the amount of free oxygen in the reaction by regulating the oxygen in the gaseous mixture from which the oxides are produced to a point where the state of oxidation prior to and during absorption does not exceed 40%.

4. The process of claim 3 in which a regulated and graduated amount of oxygen containing gas is added during absorption.

5. The process of claim 3 in which a regulated and graduated amount of air is added during absorption.

6. In a process of producing nitrites in which gases containing oxides of nitrogen produced in the oxidation of ammonia are absorbed in a suitable solution or suspension of the desired alkali, the steps which comprise adding during absorption a regulated and graduated amount of oxygen containing gas so as to maintain a state of oxidation not exceeding 40%.

7. The process of claim 6 in which the oxygen containing gas is air.

8. The process of claim 6 in which the ammonia in the ammonia-air mixture is controlled between 10 and 12.5% by volume so as to regulate the amount of free oxygen in the gas and thereby maintain prior to and during absorption a state of oxidation not exceeding 40%.

9. The process of claim 6 in which the oxygen added is sufficient to insure absorption of at least 95% of the oxides entering the process.

10. The process of claim 6 in which the yield of nitrite and nitrate is equivalent to 98% and 2% respectively on a nitrite-nitrate basis.

11. The process of claim 6 in which the alkali is taken from a group comprising sodium carbonate and sodium hydroxide.

12. The process of claim 6 in which the state of oxidation is maintained at between 10 and 40% by volume prior to and during absorption.

13. The process of claim 6 in which the state of oxidation is maintained at between 15 and 30% by volume prior to and during absorption.

14. In the process of producing nitrites in which gases containing oxides of nitrogen are absorbed in a suitable solution or suspension of the desired alkali, the steps which comprise controlling the amount of free oxygen in the gas to less than that required for the formation of $N_2O_3$ prior to the gas entering the alkaline absorption step, then adding oxygen in stages as absorption takes place.

15. The process of claim 14 in which the steps of adding the oxygen are controlled so that more NO is always present than $NO_2$.

16. The process of claim 14 in which the steps of adding the oxygen are controlled so that the state of oxidation does not exceed 40 per cent.

17. In the process of producing nitrites by the absorption of the products of oxidizing ammonia with oxygen or oxygen containing gases in a suitable solution or suspension of the desired alkali, the steps which comprise maintaining the oxygen-ammonia ratio in the oxidation step so low that after an initial absorption of the gases in water to produce nitric acid, there is insufficient oxygen for the formation of $N_2O_3$, then after the gases have entered the said alkaline absorption step, the addition of oxygen is made in steps.

WILLIAM E. KIRST.
FRED J. G. THEDIECK.